Sept. 29, 1936.  W. F. ALDER  2,055,713
HYDROSTATIC SOUND AMPLITUDE METER
Filed Sept. 21, 1932  2 Sheets-Sheet 1
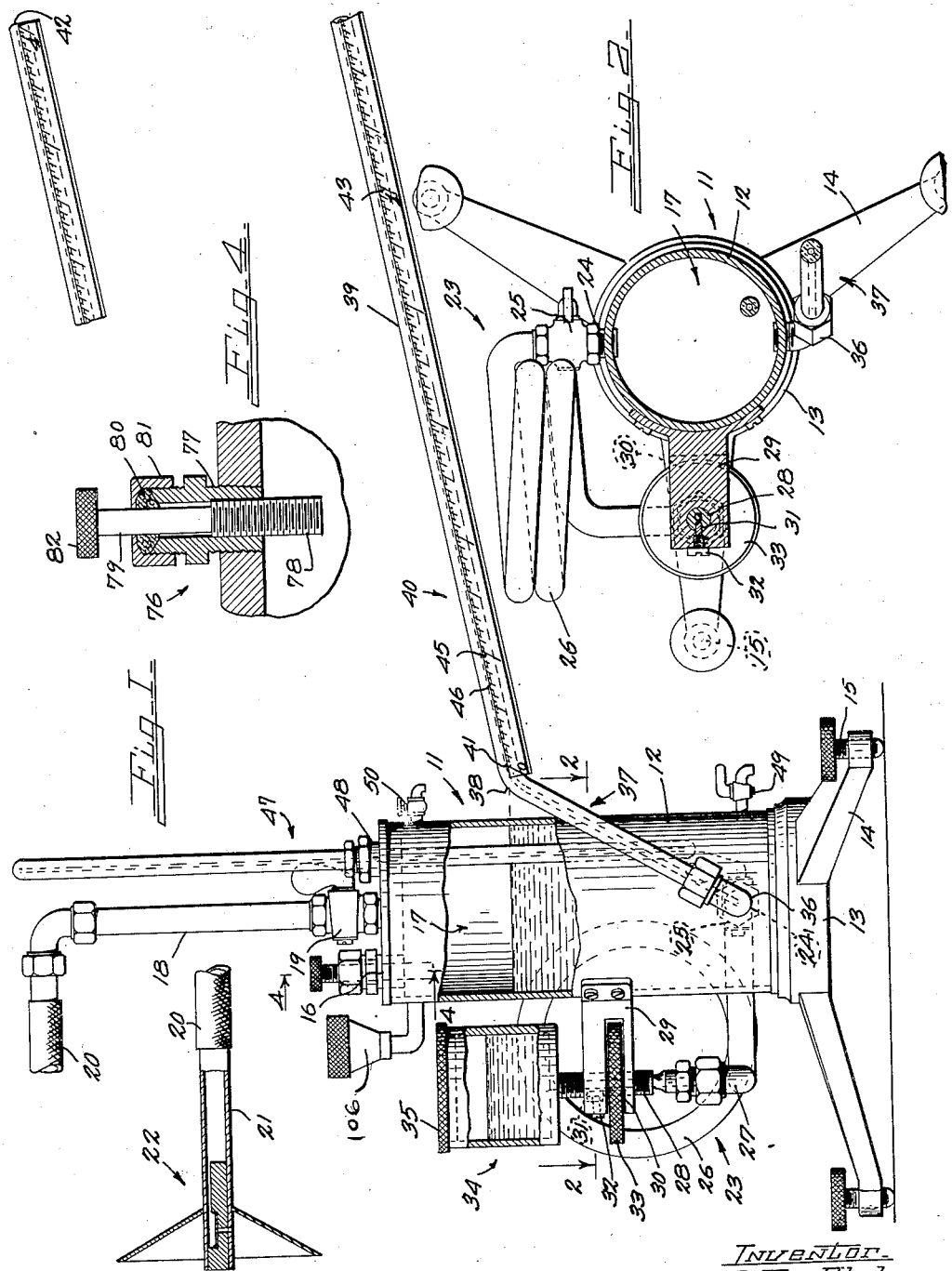
Inventor
W. F. Alder
By Hazard and
Miller
Attorneys

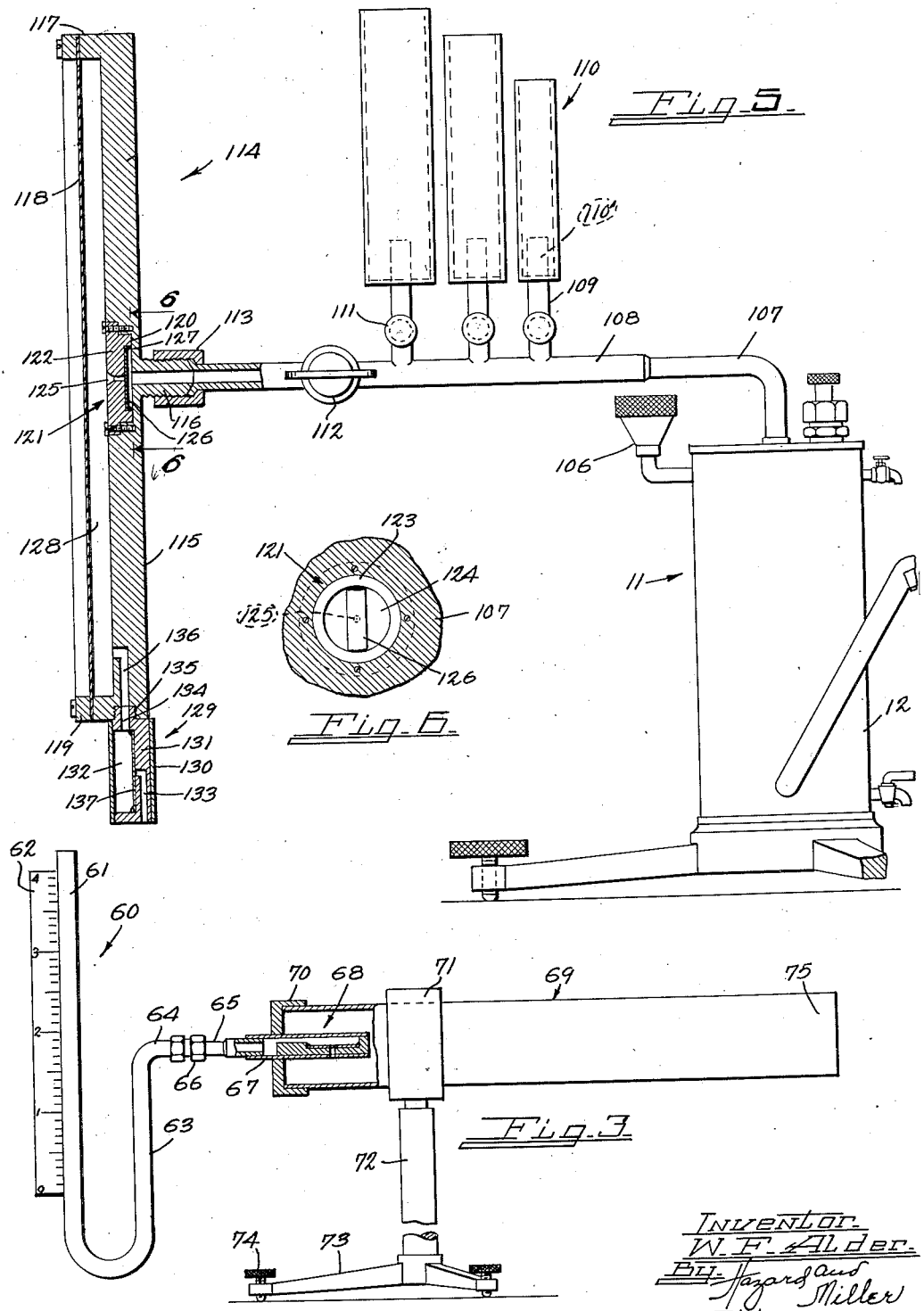

Patented Sept. 29, 1936

2,055,713

UNITED STATES PATENT OFFICE 2,055,713

HYDROSTATIC SOUND AMPLITUDE METER

William F. Alder, Altadena, Calif., assignor, by mesne assignments, to Jenness A. Alder, Altadena, Calif.

Application September 21, 1932, Serial No. 634,190

14 Claims. (Cl. 73—51)

My invention relates to a hydrostatic type of instrument which may be used to measure the amplitude of sound. The instrument is based on the principle of rectifying sound waves and building up a gaseous pressure in a chamber containing a liquid whereby a portion of the liquid is forced outwardly and upwardly in a graduated tube. The level of the liquid in the chamber and the tube is normally subjected to the pressure sound waves at an equal level or at least the liquid in the tube is at a zero point. The increased pressure, therefore, in the closed chamber, due to the compression portions of successive sound waves in building up a gas compression in the chamber, forces the liquid in the chamber downwardly and the liquid in the graduated tube upwardly. This tube is graduated so that direct readings may be obtained of heights to which the liquid is forced due to the amplitude of the sound waves.

My invention in one of its forms includes as a feature a hydrostatic means for obtaining a correct zero reading of the liquid in the graduated tube. In the preferred form of my invention, I may locate a sound rectifying valve at any suitable location, for instance, in an instrument in which material may be tested for their absorption and reflection characteristics and conduct the rectified sound waves to the air and liquid chamber.

In another form of my invention, for experimental purposes, I use a manometer in which the liquid is normally at the zero point in the graduated side of the tube. The opposite side of the tube is connected to a sound rectifying valve which may be inserted in a resonator at the closed end.

Another use of my hydrostatic construction is in connection with a noise meter in which I may use a mechanical microphone to respond to the sound and also a series of resonators for the synthesis of the noise.

My invention is illustrated in the accompanying drawings, in which:

Fig. 1 is a side elevation of my preferred form of my hydrostatic sound amplitude meter.

Fig. 2 is a horizontal section on the line 2—2 of Fig. 1 in the direction of the arrows, the drain cock being omitted.

Fig. 3 is a perspective view of the manometer type of instrument.

Fig. 4 is a vertical section on the line 4—4 of Fig. 1 in the direction of the arrows of a micrometer adjusting screw.

Fig. 5 is an elevation partly in section showing a hydrostatic meter connected to a mechanical microphone and a bank of resonators.

Fig. 6 is a detail section on the line 6—6 of Fig. 5 of a rectifying valve.

Referring first to Fig. 1, the liquid container 11 is illustrated as comprising a cylinder 12 mounted on a closed base 13 and having legs 14 with adjusting screws 15 forming the feet. There is a closure cap 16 at the top. This construction forms an enclosed chamber 17. Connected to the cap 16 there is an air tube 18 which may be designated as a sound tube. This has a closure and a relief valve 19. A flexible hose 20 connects to the pipe 18. The end of the hose has attached thereto a metal tube 21 in which is mounted a sound rectifying valve 22. The type of valve illustrated is similar to that shown in Figs. 5 and 7 of my patent application for Portable closed chamber determination of sound absorption, filed July 20, 1932, Serial No. 623,570. The valve may be located in a closed chamber, as shown in the above mentioned patent application, or in any other suitable place where it is subject to the sound waves.

A liquid tube 23 is connected at 24 adjacent the base of the cylinder. This has a closure valve 25 therein. The tube has a coil 26 and an upstanding end 27. To this end there is coupled an externally threaded nipple 28 by a suitable pipe coupling, which nipple extends through a bracket 29 having a horizontal slot 30 therein. The nipple has a longitudinal groove 31 in which engages a set screw 32 to prevent rotation of the nipple. A finger operated nut 33 is threaded on the nipple and fitted in the horizontal slot of the bracket. On the top of the nipple there is a liquid reservoir cup 34 having a removable cap 35 for filling with liquid.

A liquid outlet 36 is connected to the cylinder 12 adjacent the base and from this extends a glass rod of small bore 37. This rod is illustrated as having a bend at the point 38 and a sloping section 39 which is provided with a scale 40. The scale is illustrated as graduated in inches, having a zero point 41 and a top point 42. These points are four inches apart in elevation, but on account of the slope there is a long space between the zero mark and the one inch graduation 43 and, hence, between the one and two inch, the two and three inch, and the three and four inch graduations. Between each inch there is illustrated as being five major graduations 45, and each of these is sub-divided as indicated at 46 into twenty parts, thus graduating each vertical inch into one hundred parts. It will, therefore, be seen that a fine graduation can be made for a total of this four inch rise on account of using the tube on the slope or incline. It is obvious that, if desired, the tube may be graduated in the metric measure.

In order to ascertain the temperature of the liquid, a thermometer 47 extends through the cap 16 having a gas and liquid tight packing 48. The construction, therefore, provides for the liquid at the bottom of the chamber and an air space at the top. In order to drain the chamber, if desired, or to run off surplus liquid, a drain cock 49 is located at the bottom of the cylinder 12 and an air vent cock 50 at the top.

The manner of operating this hydrostatic sound amplitude meter is as follows:

The liquid in the cylinder 12 and in the tube 37 rises to the same elevation and should this be below the zero, the valve 25 may be opened. If the liquid in the reservoir 34 is above that in the cylinder 12 it is sometimes somewhat difficult to obtain an exact adjustment by allowing the liquid to flow from the reservoir into the cylinder 12. Therefore, the valve may be but slightly opened and the nut 33 rotated in order to elevate the nipple 28 and, hence, the reservoir 34. This gives a slightly greater pressure head flowing the liquid from the reservoir into the cylinder 12 and from the cylinder 12 into the tube 37. In manipulation of the tube I may, if desired, maintain the liquid level in the reservoir and the cylinder even. Then, by raising and lowering the reservoir an accurate adjustment of the liquid at the zero point may be obtained. Thus a compensation may be made for temperature variations in the water. The thermometer is used in order to obtain an accurate temperature. The liquid is, preferably, alcohol of a high percentage with a small amount of aniline coloring matter.

The device operates by the rectified sound waves, that is, the compression portion of such waves passing the valves and building up an air pressure in the chamber above the liquid level. This causes a depression of the liquid in the chamber and forces the liquid upwardly through the fine bore tube along the scale and readings may, therefore, be obtained and used for comparison with other tests to determine the relative sound pressures of sounds of different amplitude and of different frequencies.

In the construction of the manometer instrument of Fig. 3 I illustrate a manometer tube 60 in which there is a vertical leg 61, such tube being of relatively small diameter. Adjacent this leg there is a graduated scale 62. The opposite leg 63 is connected to a horizontal section 64, to which is attached a metal tube 65 by means of a coupling 66. A valve tube 67 is attached to the metal tube 65 and contains the rectifying valve 68, this being illustrated as of the same type as used in Fig. 1 and in my patent application above mentioned.

The valve tube and valve is illustrated as being housed in a resonator tube 69. This has a closed end 70, through which the tube 67 extends. The resonator is carried by a ring 71 which is mounted on a telescopic stand 72 having legs 73 and adjustable screws 74 forming feet. The end 75 of the resonator is open.

In the operation of this device the manometer tube is filled with a colored liquid until this reaches the zero point, when such liquid is the same level in both legs of the tube. This is prior to subjecting the resonator to the sound to which it responds. Under the influence of said sound, the resonator responds or resonates to the sound source and the sound waves of the resonator actuate the rectifying valve, building up an air pressure in the leg 63 and horizontal section 65 of the glass tube. This forces the liquid upwardly in the leg 61 and the elevation may be read on the scale 62.

In Figure 4 I illustrate a micrometer adjustment for obtaining a zero reading. This is designated by the assembly numeral 76. A bushing 77 is threaded through the cap 16 of the container 11, this bushing being internally threaded and having a screw 78 threaded internally therethrough. The upper portion of this screw is cylindrical as indicated at 79 and on this bears a packing 80 confined by a packing or stuffing box 81. The head of the screw 82 is knurled for finger operation. When the liquid has been brought to a close adjustment to the zero point then the screw can be threaded either up or down to cause displacement of the air in the closed chamber 17, or if the screw is sufficiently long displace some of the liquid, it being immaterial which is displaced. When the screw is threaded downwardly the displacement of the air against the liquid causes the liquid to rise in the tube 37. A retraction of the screw lowers the level of the liquid in this tube 37. Therefore, a fine adjustment may be obtained for the zero setting of the liquid in the graduated tube.

In Figures 5 and 6 a use of the hydrostatic meter of Figures 1 and 2 used with a mechanical microphone and a bank of resonators is illustrated. In this instance I have shown a modification of the supply reservoir 106 which is in the form of a Dole cup. This is a type which, on rotation, cuts off the supply when turned in one direction and in the other direction opens the supply. Therefore, liquid may be supplied through this cup to the cylinder 12. In this instance a rigid air inlet pipe 107 is connected to the top of the cylinder and has an air manifold 108 connected thereto. To this manifold there are a series of branch tubes 109, each tube being connected to a resonator, the set forming a bank of resonators 110. In each resonator there is a sound rectifying valve 110' similar to the valve 68 of Figure 3, or 22 of Figure 1. The tubes are controlled each by a cornet type of valve 111, these valves being such that they are normally pressed by a spring into a closed position and when the key is depressed the valves are opened, thus connecting any one resonator with the manifold 108. A stop cock 112 is connected in the manifold and by means of a coupling 113 a mechanical microphone 114 is attached to the manifold.

This microphone has a disk 115 forming a base, a nipple 116 at the center connected to the coupling 113, a flange 117 surrounding the disk, a diaphragm 118 attached to the flange, preferably by means of a clamping ring 119. The disk 115 is provided with a recess 120 in which is mounted a rectifying valve 121. This valve has a small disk 122 with an annular rim 123 on the inside. This rim is adapted to bear on the base of the recess 120. The small disk has a flat surface 124 inside of the rim and an air passage 125 is connected from the center of the flat surface 124 through this small disk of a valve. A thin ribbon 126, preferably of metal of substantially the thickness of a metal foil, is stretched across the flat surface 124, over the air passage 125, and is attached at its opposite ends by cement as indicated at 127. This valve forms the outlet from the chamber 128 formed by the disk 115, the rim 117 and the diaphragm 118. This diaphragm is preferably formed of metal and is stretched sufficiently tight so that its natural period of vibration is much above that of audibility of sound.

An inlet rectifying valve 129 is connected to the chamber 128. This valve is illustrated as having a cylinder 130 in which there is a plug 131, which plug has a recessed section 132 with an air passage 133 leading from the center of the recess to the outside air and another air passage 134 through a nipple 135, which nipple is screwed into the periphery of the disk 115 and by means of an air duct 136 communicates with the chamber 128. The sound rectifying membrane 137 is in the form of a thin strip of metal foil attached by cement to opposite ends of the recess 132. The construction of this valve in its fundamental features is the same as the valve 22.

In the operation of the assembly of Figure 5 the mechanical microphone 114 is responsive to sounds of various pitch and is nonselective and, therefore, may be used in the function of a microphone for picking up noises. On the compression portion of the sound wave deflecting the diaphragm 118 inwardly, the air in the chamber 128 is compressed. This is forced outwardly through the rectifying valve 121 and through the manifold 108 into the hydrostatic meter and the reading may be obtained, this meter of course being first set to zero. Also during the compression portion of the wave the valve 129 is closed but on the rarefaction portion of the wave where the diaphragm 118 moves outwardly the rectifying valve 129 admits air to the chamber 128, thus maintaining an average of atmospheric pressure in such chamber. Using the two valves in the mechanical microphone prevents the diaphragm from being gradually bent inwardly by the compression portions of the wave and due to the expulsion of air from the chamber 128. This investigation gives a general reading of what may be termed the sound level of a noise.

When it is desired to analyze the noise as to its different frequencies, the resonators are brought into play and in this connection, only three are illustrated, it will be understood that a sufficient number will be employed to obtain a satisfactory number of readings and the sounds of different pitch. Normally on account of using the cornet type of valve 111 each resonator is shut off from the manifold 108 but a reading may be obtained from any one resonator by opening the valve 111 and thus making a connection from any specific resonator to the hydrostatic meter 11. Thus the amplitude of sounds of any definite pitch may be obtained and consequently manifestly any combination of frequencies.

In obtaining analysis of sound such as a noise, the valve 112 can first be opened and the cornet type of valves 111 of the bank of resonators will be closed. This, then, by the action of the mechanical microphone 114 gives an indication of the general sound level. With the same sound or noise the valve 112 may then be closed and any one of the resonator valves 111 opened. Then the amplitude of any particular sound which causes the particular resonator to respond is recorded in the meter instrument. Hence, by having a bank of resonators the amplitude of the various frequencies which make up the combined sound or noise may be determined. The manifold 107 should be returned to normal pressure between the operation of the mechanical microphone 114 and any one of the resonators 110.

In the hydrostatic meter of Figure 1 the specific gravity may be made such that readings on the scale may be in dynes. For instance I have used as a liquid alcohol with a dye for a coloring matter of a specific gravity of about .8. At this specific gravity one one-hundredth of a vertical inch would equal about twenty dynes. Therefore, I may obtain with this hydrostatic meter a direct reading of the pressure due to the amplitude of sound as so many dynes in accordance with the reading.

As above mentioned, it is obvious that any of the various types of hydrostatic meters may be used as a noise meter and for synthesizing noises. They may also be used as a reverberation meter to determine the length of time required for an initial sound in a room or other enclosure to die out to inaudibility. The device may also be used for determining the absorption and reflection characteristics of sounds.

It is obvious that the rectifying valves and the mechanical microphone may be used immersed in a liquid instead of in air or in a gas and, therefore, may be utilized to determine the amplitude of sounds transmitted for instance under water. On account of the delicacy of the action of the hydrostatic meter, they may be used to give an indication of the presence or absence of sounds or rhythmic vibrations under water.

It will be apparent in addition that the hydrostatic amplitude meters of the various types illustrated herein may be used in connection with the appliances and procedures of my former patent applications hereinunder listed, using the rectifying valves of such applications or the rectifying valves illustrated herein. Prior applications are: Apparatus for determining amplitude of sound, filed October 22, 1931, Serial No. 570,486; Acoustic testing apparatus, filed March 9, 1932, Serial No. 597,828; and Portable closed chamber determination of sound absorption, filed July 20, 1932, Serial No. 623,570.

A convenient manner of making a cross check as to the pressures developed by sound waves may be made by simultaneously using the apparatus and method set forth in my patent application for Gravimetric determination of sound amplitudes, Serial No. 623,571, filed July 20, 1932, in conjunction with the hydrostatic devices described herein.

I wish to emphasize that in the hydrostatic type of sound amplitude meter, whether in the form illustrated in Figs. 1 and 5 with the sloping graduated tube, or the manometer type of Figure 3, that such meters may be used with any of the types of sound rectifying valves of my patent applications above mentioned and such meters may be substituted for the sound amplitude meters of such applications, such applications showing a meter in which a sound chamber is expanded by the accumulative sound pressures and a ray of light is deflected. The sound may be picked up by a suitable rectifying valve in any of the apparatus set forth in the above mentioned patent applications except the gravimetric type and then pressure is recorded in the hydrostatic type of meter. The hydrostatic devices are, therefore, eminently suitable for determining sound pressures in a small closed chamber, in a room, or in the open, in which latter cases it may be preferable to use parabolic or equivalent constructions to possibly project and to collect the sound waves. The meters may, therefore, be used for determining the absorption of sound by various materials, reflection of sound, and the transmission of sound through materials.

Another important development of my present application is in connection with the mechanical microphone designated at 114 in Figure 5. This is eminently suitable as a noise meter for making a survey of industrial noises of various characters and for use in testing reverberation in closed rooms or chambers, the microphone being connected, of course, to a suitable sound responsive meter. In order to make a comparison between absolute measurements as obtained in accordance with my patent application for the Gravimetric determination of sound amplitudes, above mentioned, the various types of hydrostatic sound amplitude meters may be utilized. They may then be graduated, if desired, in accordance with the absolute measurements of the gravimetric system.

An important characteristic of the sound rectifying valve is that the strip of metal foil is stretched tightly on a flat surface and that the inlet port for the condensation phases of the sound wave is quite small and has an opening centrally located as regards the width of the foil. The tension on the foil is such that its natural period of vibration is above that of audible sound and hence in any audible sound to be tested there will not be a resonance set up by the vibration of the foil. It is rather difficult to determine the exact action of the stretched foil on the flat surface but it is believed that on the condensation phases of the sound waves there is a dynamic action of a pulsation of air through the inlet port on the underside of the foil. The small quantities of pulsating air have a kinetic energy which stretches the foil sufficiently that minute quantities of air at a time may pass between the flat surface and the underside of the foil into the chamber back of the foil. The seal of the foil on the flat surface to prevent escape of the trapped air and thus maintain the pressure during the rarefaction phases of the sound wave is believed to be due to the static pressure of the still air in the chamber pressing on the large area of the foil and holding it firmly sealed on its flat seat.

Various changes may be made in the details of construction without departing from the scope of the invention as defined by the appended claims.

I claim:

1. An instrument to measure the amplitude of sound, comprising a chamber with hydraulic fluid therein, a tube connected to a portion of the chamber below the surface of the fluid, said tube having graduations in one part with a zero indicating point, and means to build up accumulated air pressure in the chamber above the surface of the fluid by the action of sound waves whereby the column of liquid in the tube is forced upwardly, the upper end of the column passing the graduations, a liquid supply means connected to the chamber to vary the surface level of the liquid in the chamber and thereby bring the top of the column in the tube initially to the zero point, and means to disconnect the liquid supply means and the chamber.

2. An instrument to measure the amplitude of sound, comprising a closed container having a tube having a hydraulic fluid therein, said tube being connected to the container and having a section rising to at least the surface of the fluid and another section rising above the surface of the fluid, the section above the fluid surface having graduations, a zero indication on the tube, the liquid being adapted to rise in the tube to the zero, and means to create a positive accumulated pressure in the container above the surface of the fluid due to the compression phases of sound waves and thereby cause a flow of fluid from the container to the tube and force the upper end of the column of fluid in the tube upwardly past the graduations, means to control the height of fluid in the container and the said tube to adjust such liquid to the zero level, comprising a movable reservoir and a connection from the reservoir to the container to thereby control the height of the fluid surface in the container, and means to disconnect the reservoir and the chamber.

3. An instrument to measure the amplitude of sound, comprising a closed container, a small bore tube connected thereto adjacent the base, said tube having a section rising toward the upper portion of the container and a second section with a slope, the second section have a scale, a sound wave rectifying valve, a connection from the valve to the container, a hydraulic fluid in the container, the fluid being free to flow from the container into the tube and form a column in the tube with the top of the column at a zero marking on the scale, the accumulated pressure due to the rectified compression phases of sound waves being adapted to increase the pressure on the surface of the fluid and force the top of the column in the tube upwardly along the inclined section having the scale, means to regulate the surface level of the fluid in the container and hence the top of the column in the tube, comprising a vertically moving reservoir, a pipe connected to the reservoir and the container, means to vertically raise and lower the reservoir, and means to disconnect the reservoir and the chamber.

4. A sound rectifying valve comprising a disc having a small sound passage therethrough and a flat surface on one side of the passage, and a valve element in the form of a thin strip of metal foil attached to the flat surface and stretched tightly thereacross forming a closure at the outlet end of the sound passage.

5. A sound rectifying valve comprising a valve housing having a chamber with a valve seat therein with a small inlet port through the seat, a valve element in the form of a thin strip of metal foil attached to the housing at its opposite ends and free at its opposite sides and stretched across the seat to form a closure for the inlet port, the material of the strip when stretched having a natural period of vibration above the audibility of sound, and an outlet from the said chamber.

6. A sound rectifying valve comprising a valve housing having a chamber with a flat internal surface with a small inlet port through said surface, a valve element in the form of a thin strip of metal foil attached to said surface at places on opposite sides of said port and stretched across the said port whereby the natural period of vibration of the foil is above the audibility of sound, and an outlet from the said chamber.

7. A sound rectifying valve as claimed in claim 6, the said inlet port being small compared with the width and the length of the strip, and positioned substantially in the center of the strip, and the opposite sides of the strip being free of said surface.

8. An instrument to measure the amplitude of sound comprising a mechanical microphone having a diaphragm, a chamber back of the diaphragm, an outlet rectifying valve from the chamber, an inlet rectifying valve to the chamber, and a connection from the outlet rectifying valve to an instrument for measuring the amplitude of sound.

9. An instrument to measure the amplitude of sound comprising a mechanical microphone having a housing structure with a vibratable diaphragm on one side and a chamber back of the diaphragm, an outlet rectifying valve from the chamber, an inlet rectifying valve to the chamber, a manifold connected to the outlet rectifying valve, and an instrument for measuring the amplitude of sound connected to said manifold.

10. In an instrument to measure the amplitude of sound, a mechanical microphone having a diaphragm, a chamber back of the diaphragm, an outlet rectifying valve from the chamber and an inlet rectifying valve to the chamber, said outlet valve being adapted to transmit a compressed fluid from the chamber on the compression phases of a sound wave and the inlet valve being adapted to admit a fluid to the chamber on the rarefaction phases of a sound wave.

11. In an instrument as described in claim 10, the diaphragm being stretched sufficiently tight so that its natural period of vibration is above the audibility of sound.

12. In an instrument to measure the amplitude of sound, a mechanical microphone having a housing structure with a tightly stretched vibratable diaphragm on one side, there being a chamber back of the diaphragm, an outlet rectifying valve from the chamber having a flat surface forming a valve seat with a port to the said surface, a tightly stretched strip of foil bearing on the seat, an inlet rectifying valve to the chamber having a flat internal surface with an inlet port to the said surface, and a strip of foil bearing on said latter surface.

13. In a device for determining sound characteristics, a sound wave rectifying valve having a valve body with a hollow chamber and a flat surface on one side of said chamber, a thin elongated narrow metal strip secured at its opposite ends to said surface and free at its opposite sides, there being an opening through the valve body and through the said surface to the under side of the said strip for passage of a portion of the sound transmitting medium when the valve is subject to the action of sound waves.

14. In a device as claimed in claim 13, a duct leading from said hollow chamber in the valve body, an expansible chamber connected to the said duct, and means operated by the expansion of said chamber to indicate sound characteristics.

WILLIAM F. ALDER.